United States Patent
Ma et al.

(10) Patent No.: US 11,762,945 B2
(45) Date of Patent: Sep. 19, 2023

(54) SYNCING STREAMS BY INTELLIGENT COLLECTION AND ANALYSIS

(71) Applicant: International Business Machines Corporation, Armonk, NY (US)

(72) Inventors: Jing Yan Ma, Beijing (CN); Chu Yun Tong, Beijing (CN); Li Cao, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 17/117,237

(22) Filed: Dec. 10, 2020

(65) Prior Publication Data

US 2022/0188379 A1 Jun. 16, 2022

(51) Int. Cl.
*G06F 9/44* (2018.01)
*G06F 17/15* (2006.01)
*G06F 16/14* (2019.01)
*G06F 17/16* (2006.01)

(52) U.S. Cl.
CPC .......... *G06F 17/153* (2013.01); *G06F 16/148* (2019.01); *G06F 17/16* (2013.01)

(58) Field of Classification Search
None
See application file for complete search history.

(56) References Cited

U.S. PATENT DOCUMENTS

| | | | |
|---|---|---|---|
| 7,069,176 B2 | 6/2006 | Swaine | |
| 8,683,027 B2 * | 3/2014 | Li | G06F 9/4843 |
| | | | 709/218 |
| 9,142,049 B2 | 9/2015 | Fletcher | |
| 9,588,662 B2 * | 3/2017 | Sood | G06F 16/258 |
| 2013/0139166 A1 * | 5/2013 | Zhang | G06F 16/24568 |
| | | | 718/102 |
| 2013/0304819 A1 * | 11/2013 | Oane | G06Q 50/01 |
| | | | 709/204 |
| 2014/0067951 A1 * | 3/2014 | Sheinfeld | G06Q 50/01 |
| | | | 709/204 |
| 2014/0358926 A1 * | 12/2014 | McGregor | G06F 16/2477 |
| | | | 707/736 |
| 2016/0182251 A1 * | 6/2016 | Weygandt | G06F 16/24568 |
| | | | 710/316 |
| 2017/0090889 A1 * | 3/2017 | Hale | G06F 8/433 |
| 2023/0122597 A1 * | 4/2023 | Shah | G06F 9/505 |
| | | | 705/7.36 |

OTHER PUBLICATIONS

"Data Flow in Operations Analytics Predictive Insights", IBM Operations Analytics Predictive Insights, Version 1.3.5, printed on Aug. 4, 2020, 3 pages, <https://www.ibm.com/support/knowledgecenter/en/SSJQQ3_1.3.5/com.ibm.scapi.doc/intro/c_tasp_intro_dataflow1.html>.

(Continued)

*Primary Examiner* — Qamrun Nahar
(74) *Attorney, Agent, or Firm* — Stephen R. Yoder

(57) ABSTRACT

Synching multiple streams in a complex enterprise product by collecting and analyzing stream dependency data. Collection and analysis of data for large scale and complex enterprise results in a multi-dimensional relationship diagram that highlights the interconnected dependencies of the streams. This allows enterprise software users to more easily determine and select which stream (or streams) will help the user to perform a given task.

18 Claims, 11 Drawing Sheets

(56) References Cited

OTHER PUBLICATIONS

"From Data to Insights: How IT Operations Data Can Boost Quality", Cognizant, cognizant 20-20 insights | Nov. 2016, 5 pages.

Gilenson, Sasha, "Smashing the Silos with Blended Analytics", A Techwell Community, Jun. 25, 2015, 4 pages, <https://www.cmcrossroads.com/article/smashing-silos-blended-analytics>.

Sheldon, Robert, "Microsoft Azure Stream Analytics", Jun. 2, 2015, 14 pages, <https://www.red-gate.com/simple-talk/cloud/cloud-data/microsoft-azure-stream-analytics/>.

Weigand, Dan, "IBM Z Operations Analytics", IBM Z / Sep. 2018 / © 2018 IBM Corporation, 42 pages.

\* cited by examiner

SYNCING STREAMS BY INTELLIGENT COLLECTION AND ANALYSIS

BACKGROUND

The present invention relates generally to the field of data analysis, and more particularly to a streamlined process of collecting structured and unstructured operational data in a manner that allows a decision maker to use this collected data to make real-time decisions.

SUMMARY

According to an aspect of the present invention, there is a method, computer program product and/or system that performs the following operations (not necessarily in the following order): (i) receiving, by a stream reception module, a plurality of streams, with the plurality of streams including information indicative of a given stream dimension; (ii) monitoring the sequence and correlation of the streams in the plurality of streams to generate a multi-dimensional stream relationship diagram; (iii) responsive to the generation of the multi-dimensional stream relationship diagram, dynamically adjusting the relevance of the given stream dimensions that respectively correspond to each stream in the multi-dimensional stream relationship diagram; (iv) responsive to the dynamic adjustment, determining which streams of the plurality of streams has achieved a sufficient change, and creating an optimized stream relationship diagram to reflect the change made to the given stream of the plurality of streams.

DETAILED DESCRIPTION

Figure 1:
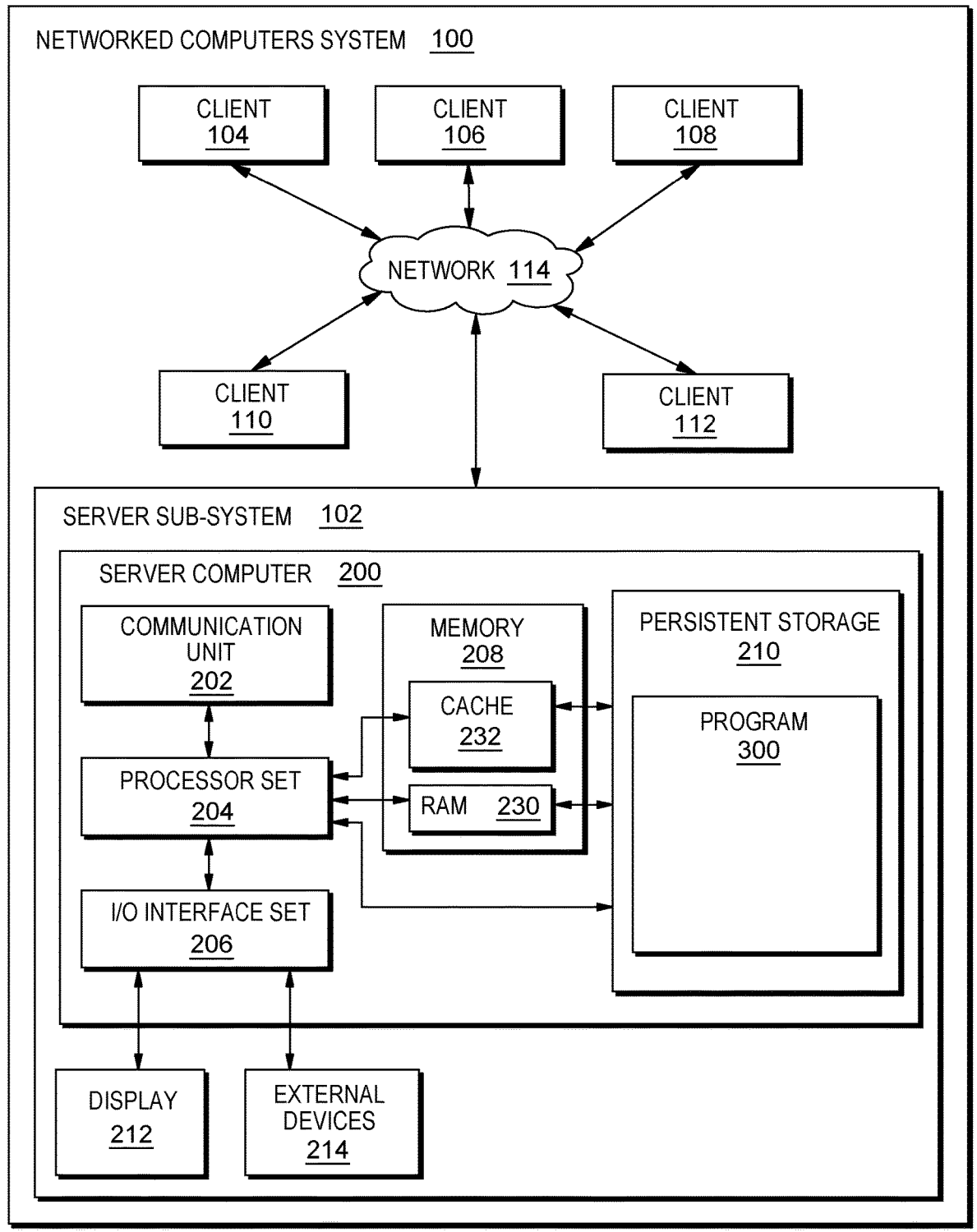
FIG. 1 is a block diagram view of a first embodiment of a system according to the present invention.

Some embodiments of the present invention are directed to synching multiple streams in a complex enterprise product by collecting and analyzing stream dependency data. Collection and analysis of data for large scale and complex enterprise results in a multi-dimensional relationship diagram that highlights the interconnected dependencies of the streams. This allows enterprise software users to more easily determine and select which stream (or streams) will help the user to perform a given task.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
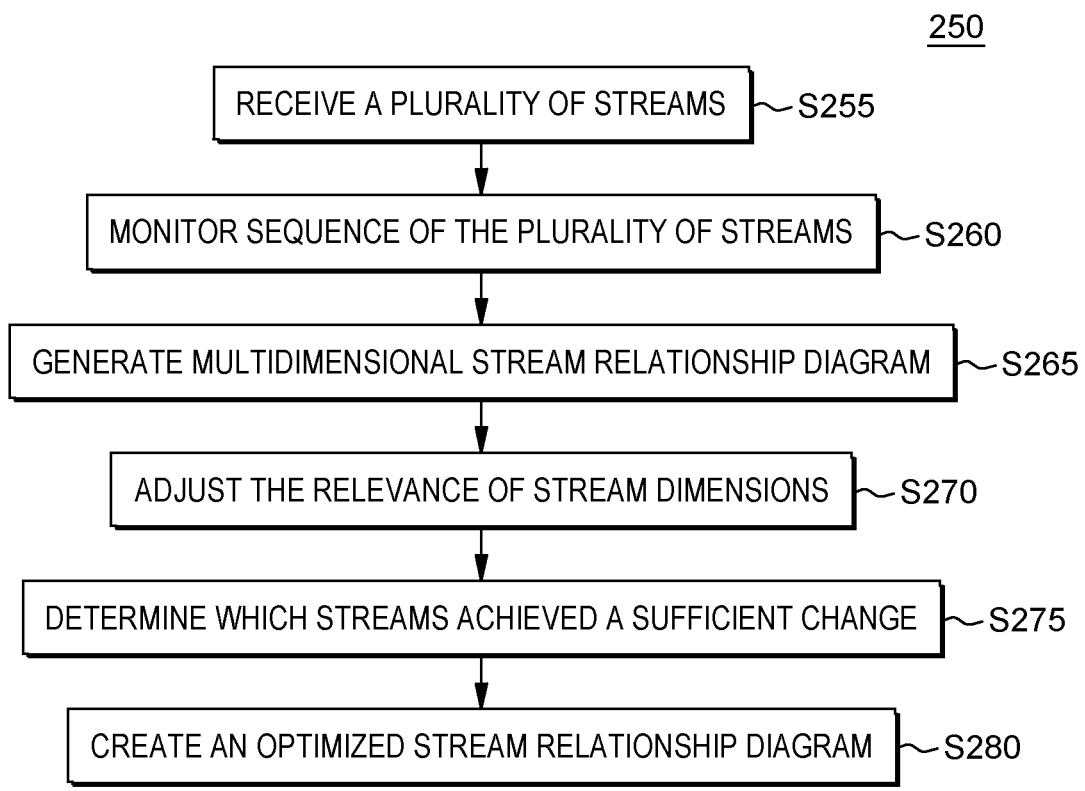
FIG. 2 is a flowchart showing a first embodiment method performed, at least in part, by the first embodiment system.
Figure 3:
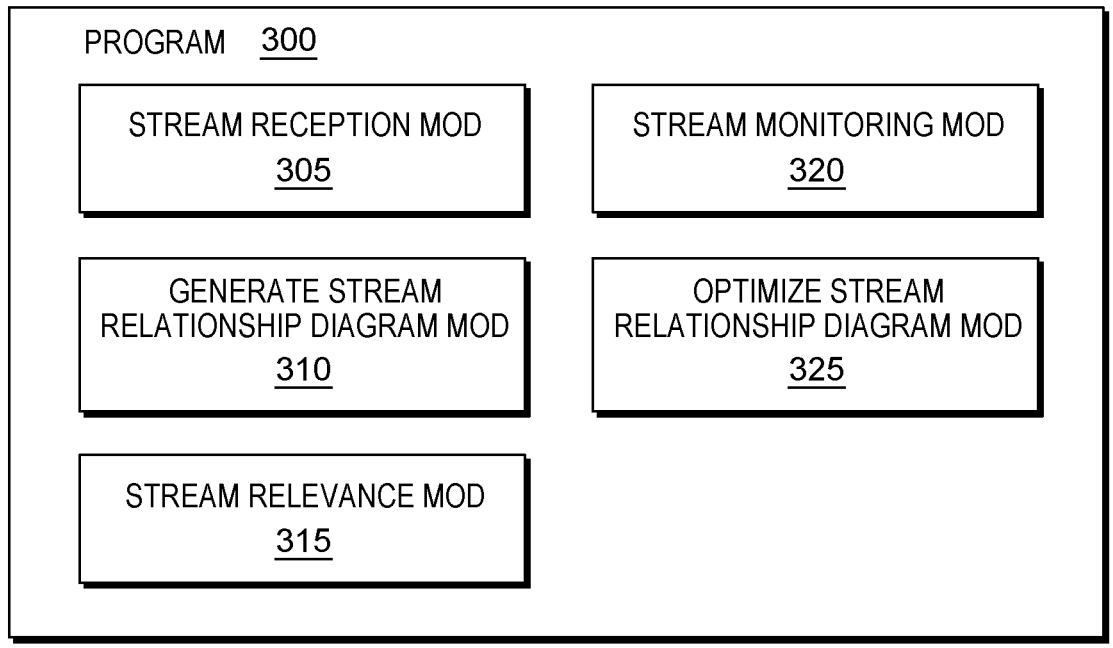
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where stream reception module ("mod") 305 receives a first set of streams. In some embodiments, the first set of streams includes various software modules that can perform operations that are required by an enterprise software user in a given systems environment. Additionally, the first set of streams includes multiple components (such as those shown in FIG. 4).

Processing proceeds to operation S260 where stream monitoring mod 320 monitors the sequence and the correlation of the various of streams received from stream reception mod 305 (as discussed in connection with operation S255, above). In some embodiments of the present invention, stream monitoring mod 320 determines the dependencies between and amongst the various streams that are received so that an accurate stream relationship diagram can be generated. In addition to determining the dependencies between and amongst the various streams, stream monitoring mod 320 also determines the dependencies between the various streams and the dimensions to which they belong (such as code 502 shown in FIG. 5).

Processing proceeds to operation S265 where generate stream relationship diagram mod 310 generates a multi-dimensional stream relationship diagram. In some embodiments of the present invention, generates the multi-dimensional stream relationship diagram based upon the dependencies between the streams and their respective dimensions (as determined by stream monitoring mod 320 in connection with operation S260, above). The multi-dimensional stream relationship diagram is discussed in greater detail with respect to FIG. 5, below.

Processing proceeds to operation S270 where stream relevance mod 315 determines and adjusts the relevance value for the various stream dimensions (such as data 522 shown in FIG. 5). In some embodiments of the present invention, adjusting the stream relevance value by stream relevance mod 315 allows a given enterprise software user to narrow his or focus to a select group of streams. For example, diagram 600 of FIG. 6 shows one non-limiting example of a relevance being determined. FIG. 6 shows environment dimension 602 (which is analogous to environment dimension 542 in FIG. 5) being set as the relevant dimension. This is graphically represented by the fact that environment dimension 602 and its downstream components are being focused on for the purposes of potentially selecting a stream. Additionally, in some embodiments, stream relevance mod 315 determines the relevance value based on a mathematical formula (represented by Formula F1, which is discussed in greater detail below in Sub-Section III).

Processing proceeds to operation S275 where stream monitoring mod 320 determines which stream of the first set of streams has achieved a sufficient change. That is, at operation S275, stream monitoring mod 320 determines whether there have been any major changes to the dependencies between the various streams and the relevant dimensions that are selected. Referring back to the example in FIG. 6, stream monitoring mod 320 determines that there are changes in the dependencies between the streams, specifically with respect to ELK version 604, logstash 606, basic search 608 and kibana 610.

Processing finally proceeds to operation S280 where optimize stream relationship diagram mod 325 modifies the previously generated multi-dimensional stream relationship diagram to obtain an optimized stream relationship diagram. In some embodiments, optimize stream relationship diagram mod 325 takes into account the relevance value (determined in connection with operation S270, above) and which stream(s) have achieved a sufficient enough change to trigger a change in the stream dependency structure (as discussed in connection with operation S275, above). One example of this optimized stream relationship diagram is shown in diagram 600 of FIG. 6 (with respect to the components stemming from component E1 612).

III. FURTHER COMMENTS AND/OR EMBODIMENTS

Some embodiments of the present invention recognize the following facts, potential problems and/or potential areas for improvement with respect to the current state of the art: (i) in a complex enterprise product, the relationship between each stream is not only the relationship between the upstream and downstream pipelines, but also the more complex interdependence between the various streams and relate to open source software. Therefore, if any stream changes, it is very difficult for other streams to make corresponding changes. Such a small mistake is a big problem for customers.

Some embodiments of the present invention may include one, or more, of the following features, characteristics and/or advantages: (i) a stream is the collective name that is given to something that may contain all components in our system (with the components coming from both upstream and downstream sources); (ii) many components have dependencies to other components (shown, for example, in FIG. 4); (iii) a relevance threshold can be determined in part upon the needs of customers; (iv) various threshold values will lead to varying accuracies but also consume different effort; (v) if a given customer wants to quickly locate the most affected components, the threshold can be set as the "most" relevant; and (vi) if a given development team wants to traverse all the components that may be affected, then the relevance weights can be set at a smaller value.

Figure 4:
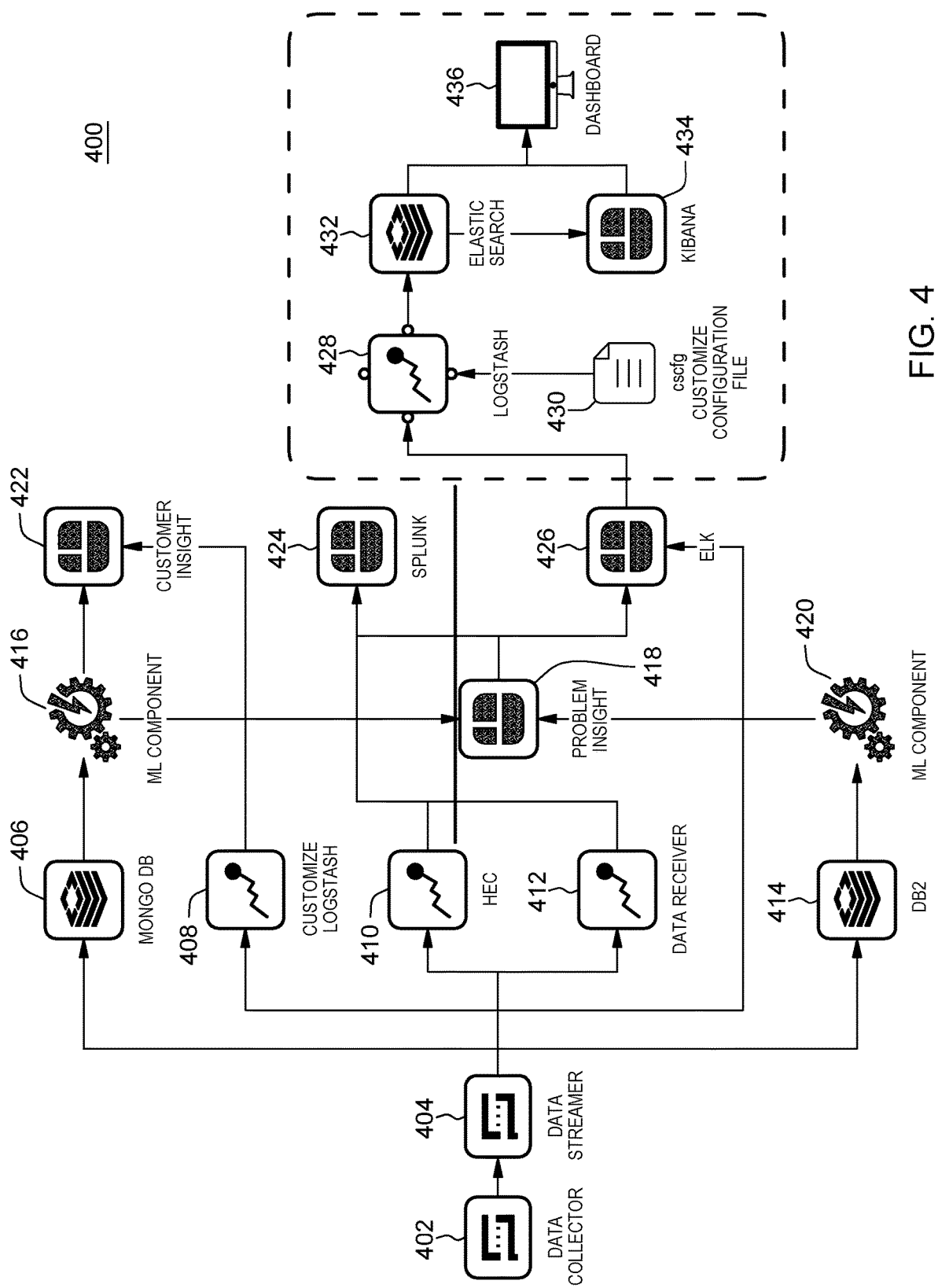
FIG. 4 is a block diagram of a first embodiment of a system according to the present invention.

Block diagram 400 of FIG. 4 shows one illustrative instance of a relationship between various streams that include multiple components. These components include: data collector 402, data streamer 404, Mongo Database (DB) 406, customize logstash module 408, HEC module 410, data receiver 412, Database 2 (DB2) 414, Machine Learning (ML) component 416, problem insight module 418, ML component 420, customer insight module 422, splunk module 424, ELK module 426, logstash module 428, customize configuration file 430, elastic search module 432, Kibana module 434, and dashboard 436.

Some embodiments of the present invention may include one, or more, of the following features, characteristics and/or advantages: (i) the complex relationship between streams is not only affected by code but also by different factors; (ii) these factors include environment, models used, types of data used, and comparisons between the various steams (through the lens of a dependency graph and/or the use of an inclusion relationship model); (iii) it is difficult to isolate the relevant change data found between the various streams; (iv) scanning all of the correlations between the various streams takes a significant amount of time; (v) the time that it takes to scan these correlations is typically not accepted by clients, especially with respect to urgent issues; and (vi) it is important for customer and developers that with any changes in each given stream, the relevant update can be quickly located based on multiple dimensions and relevance according to client needs.

Some embodiments of the present invention may include one, or more, of the following features, characteristics and/or advantages: (i) dynamically generates the relationship between streams according to different dimensions (such as code, environment, model, data, as mentioned above); (ii) dynamically superimpose a relationship diagram showing the various and relevant dimensions to form a multi-dimensional relationship diagram; and (iii) marking different dimensions with distinguishing features (such as color, font, size, etc.).

Some embodiments of the present invention may include one, or more, of the following features, characteristics and/or advantages: (i) accelerates problem identification, isolation, and resolution by providing application owners, application developers, subject matter experts, and operations staff with actionable insights into the health of their Information Technology (IT) operations environment; and (ii) provides proprietary operational data to multiple subscribers in an easy-to-use and consistent format through both proprietary and third-party analysis platforms (such as Splunk, Elasticsearch, etc.).

Some embodiments of the present invention may include one, or more, of the following features, characteristics and/or advantages: (i) locates a stream that is updated in a given set of inter-connected streams; (ii) analyze the relationship between streams from the data dimension and other dimensions (such as the code dimension and the environment dimension); (iii) generate a graphical representation of the relationships between streams relationship based on multiple dimensions; (iv) assesses the possible impact between the various streams and that if a stream is updated, then the affected stream can be quickly located; and (v) solves multiple interdependent streams under a complex framework.

Some embodiments of the present invention includes creating a system for determining which stream is optimal for use by an enterprise and/or an enterprise user. This system includes at least the following three (3) components: (i) Central Processor; (ii) Stream Processing module; and (iii) Notification module. In this system, the central processor component includes a stream configuration module and a stream analysis module (as shown in connection with the discussion of FIG. 8, below). Additionally, the stream processing module includes an event trigger module and a stream execution module (as illustratively shown in FIG. 8).

In some embodiments, when there is some change that is made to a given stream, the event trigger module will be alerted, and the event trigger module will collect the change information and analyze the possible impact of this change. Subsequently, the event trigger module will notify the central processor of the analyzed impact of the change to the given stream.

In this embodiment, when the central processor receives the notification information regarding the impact of the change to the given stream, the central processor will use its stream configuration module to determine the following: (i) which stream(s) are associated with the given stream that had some type of change made to it; and (ii) which stream(s) are willing to accept an automatic synchronization. In some embodiments, the stream analysis module performs a second analysis to obtain the analysis result (to determine at least whether additional changes were made to streams) and sends these results to the stream processing component of a corresponding stream through a notification module. This is further illustrated in block diagram 800 of FIG. 8.

In some embodiments, the stream execution module in the stream processing component (such as stream execution module 816 of stream A 810) is modified synchronously to keep each stream consistent. After this operation is completed, the stream execution module (such as stream execution module 816) sends the processed stream back to the central processor (such as central processor 802) through the notification module (such as notification module 814).

With respect to the process of dynamically adjusting the relationship diagram each time, the correlation of different dimensions between each stream will be given a correlation degree, and the color of the node will change as the correlation degree changes. In this manner, embodiments of the present invention can quickly find the most relevant stream through different colors schemes and/or color depth based on the setting of the threshold.

Embodiments of the present invention provide a method to quickly locate the most relevant stream according to the stream dimension and stream relevance. Operations that are included in this method include, but are not necessarily limited to, the following (and not necessarily in the following order): (i) dynamically generate stream diagrams based on different dimensions; (ii) dynamically monitor the sequence and correlation of different dimensions to generate a multi-dimensional stream relationship diagram; (iii) determine the unknown relationship by marking dimension hot spots and sequence; and (iv) obtain an optimized tree diagram showing varying thresholds by pruning the existing relationship according to the dimensions and relevance of the streams.

Figure 5A:
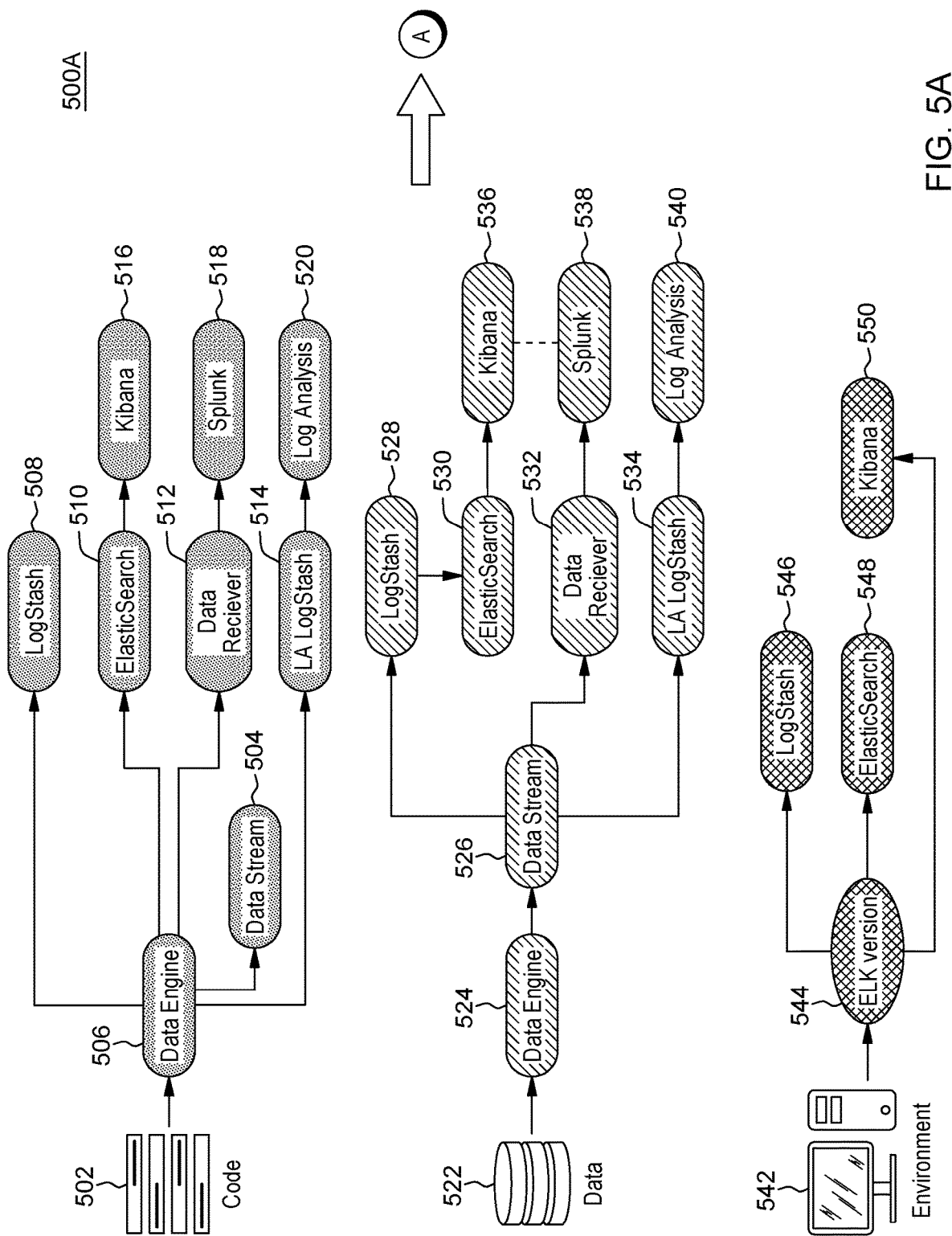
FIG. 5A is a process diagram showing information that is generated by embodiments of the present invention.
Figure 5B:
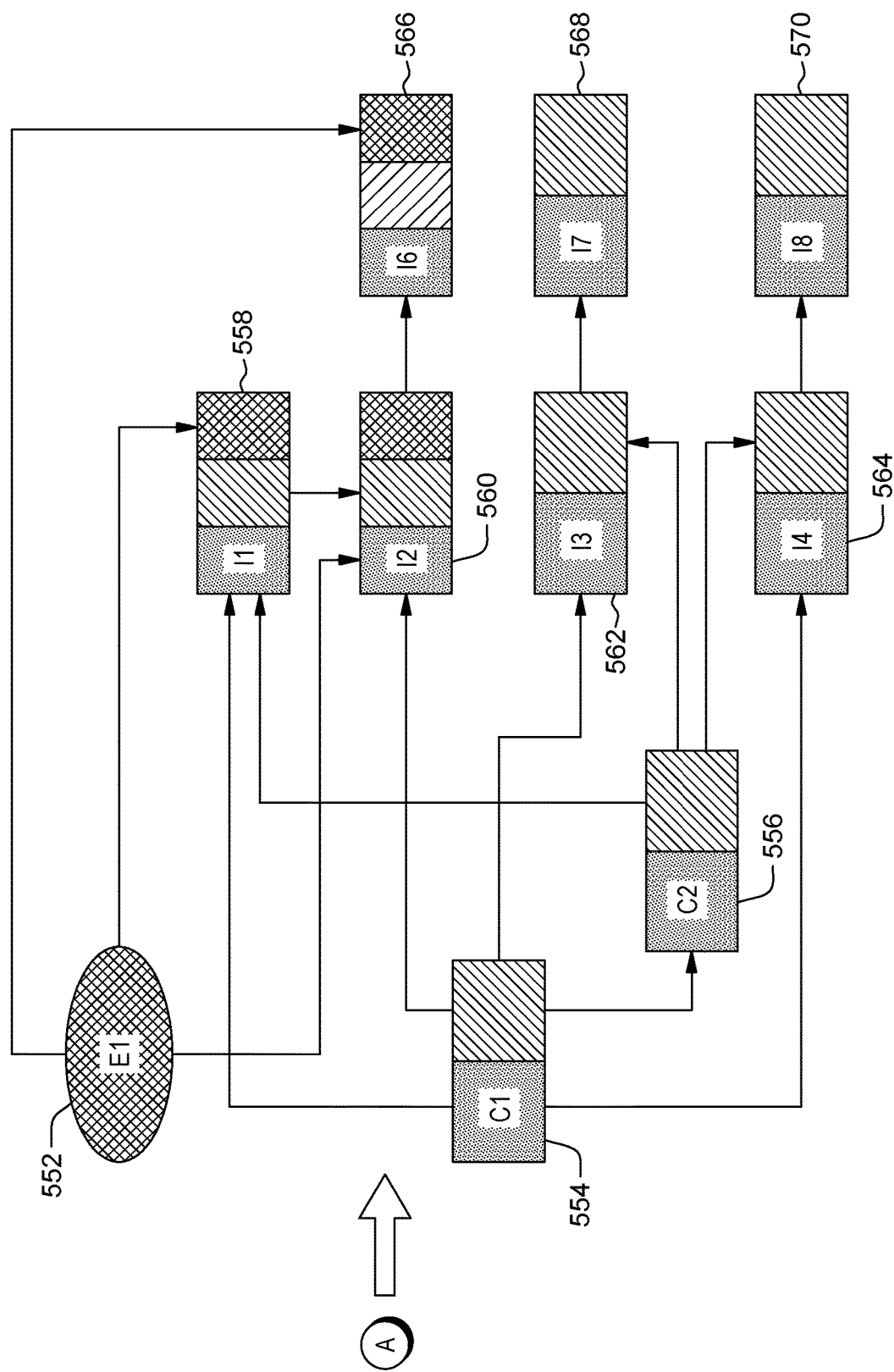
FIG. 5B is a process diagram showing information that is generated by embodiments of the present invention.
Figure 6:
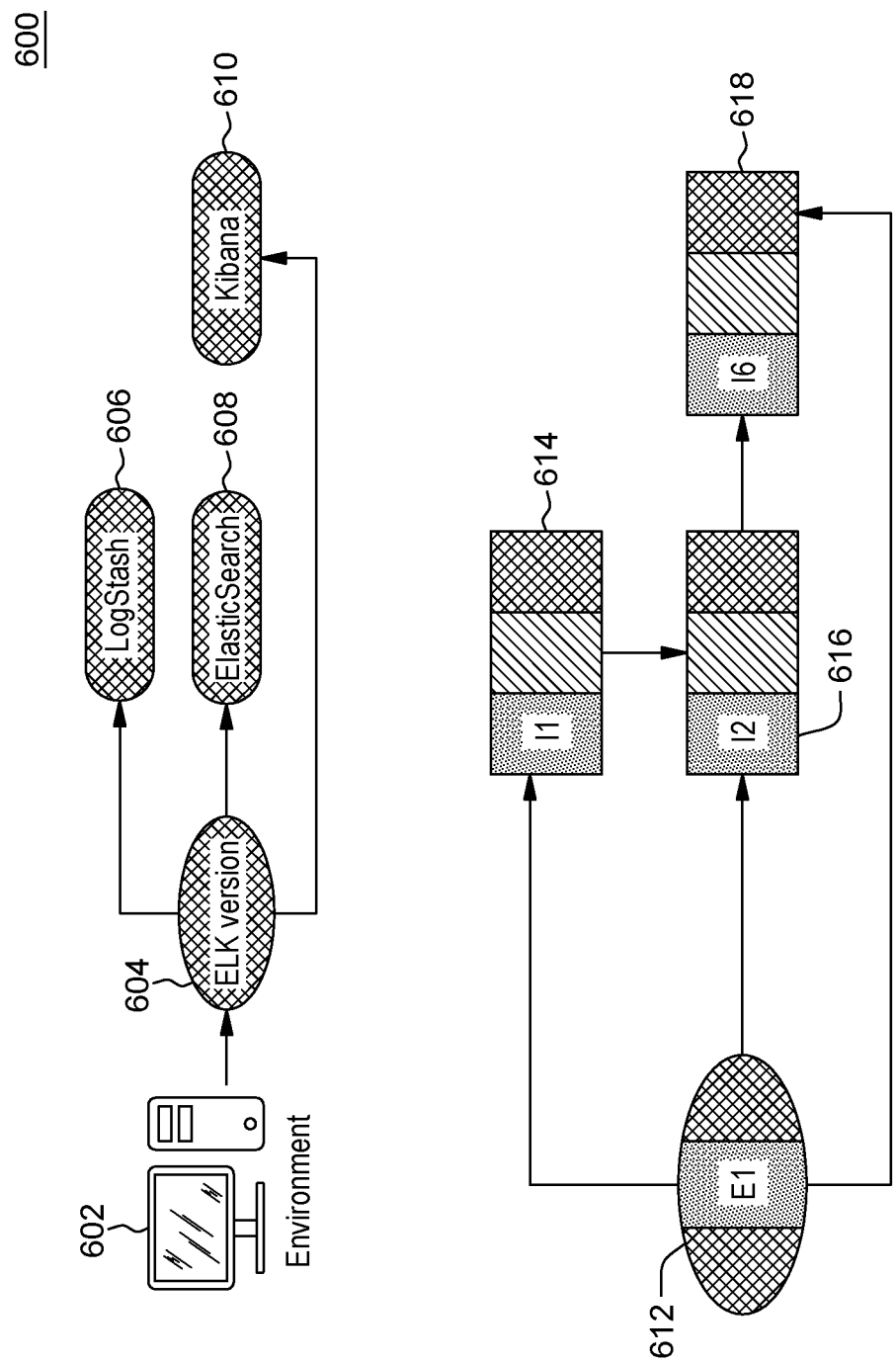
FIG. 6 is a block diagram of a second embodiment of a system according to the present invention.

Block diagrams 500A and 500B of FIGS. 5A and 5B collectively show a detailed process of generating a multi-dimensional relationship between various dimensions that are used to evaluate the relationship(s) between and amongst the various streams used by certain embodiments of the present invention. Block diagrams 500A and 500B includes three dimensions (code 502, data 522, and environment 542). The first dimension, code 502, includes the following components: data stream 504, data engine 506, logstash module 508, elastic search 510, data receiver 512, LA logstash module 514, kibana 516, splunk 518, and log analysis module 520. The second dimension, data 522, includes the following components: data engine 524, data stream 526, logstash module 528, elastic search module 530, data receiver 532, LA logstash module 534, kibana 536, splunk 538, log analysis module 540. The third dimension, environment 542, includes the following components: ELK version 544, logstash 546, elastic search 548 and kibana 550.

These three dimensions can be dynamically super-imposed to generate a graphical representation showing the multi-dimensional relationship between the various components of code 502, data 522 and environment 542. One illustrative instance of this multi-dimensional relationship is further shown in block diagram 500B, including the following super-imposed components: E1 552, C1 554, C2 556, I1 558, I2 560, I3 562, I4 564, I6 566, I7 568 and I8 570. In this illustrative instance of the multi-dimensional relationship, the various components are shown in a super-imposed manner. For instance, C1 554 graphically represents the superposition of data engine 506 (from the dimension code 502) and data engine 524 (from the dimension data 522).

It is important to note that the dependencies between the various dimensions and their respective components is not arbitrary. Rather, the dependences between the various dimensions and their respective components is based upon a relevance evaluation method. The operations of the relevance evaluation method include the following (and not necessarily in the following order): (i) for the downstream portion of a node, set the relevance and weight of related items based on the dimension type (for instance, the code dimension 502); (ii) set the correlation of classes in the downstream portion of the node (for instance, $B_{RELEVANCE} = (B_{IRELEVANCE})$; (iii) set the weight of the correlation of each class (for instance, $B_{WEIGHT} = B_{IRELEVANCE}$); and (iv) calculate the correlation of the different dimensions of nodes.

For example, the degree of relevance can be calculated by using the following formula (F1):

$$\Sigma_{i=0}^{n} Bi_{relevance} * Bi_{weight}/n \quad \text{(F1)}$$

Additionally, $B_{WEIGHT}$ is set according to the weight of the impact. $B_{IRELEVANCE}$ is set using a constant value that falls between zero (0) and one (1) if the class has been affected by the upstream portion of the node.

Block diagram 600 of FIG. 6 shows an illustrative example of combining one portion of a dimension (such as code dimension 502, shown above or environment dimension 542, also shown above). Block diagram 600 shows the following: environment dimension 602, ELK version 604, logstash 606, elastic search 608, kibana 610, E1 612, I1 614, I2 616 and I6 618. In this particular instance, block diagram 600 shows that when environment dimension 602 (in the present figure) is combined with code dimension 502 (from FIG. 5, discussed above), the ELK version changes. The result of this change to the ELK version is that logstash 606 and elastic search 608 must modify the code to match the new ELK version. Additionally, the changes to the code with respect to logstash 606 will also effect changes to elastic search 608 and kibana 610.

This change is shown with node E1 612 having newly added code dependencies. Further, a new dependence relationship is generated to shown the dependencies between E1 612 and I1 614, I2 616 and I6 618. As shown in FIG. 6, certain portions of I1 614 and I2 616 are shown with a more intense impression because of the increased relevance of logstash 606 and ELK version 604 from the code dimension (such as code dimension 502).

Figure 7:
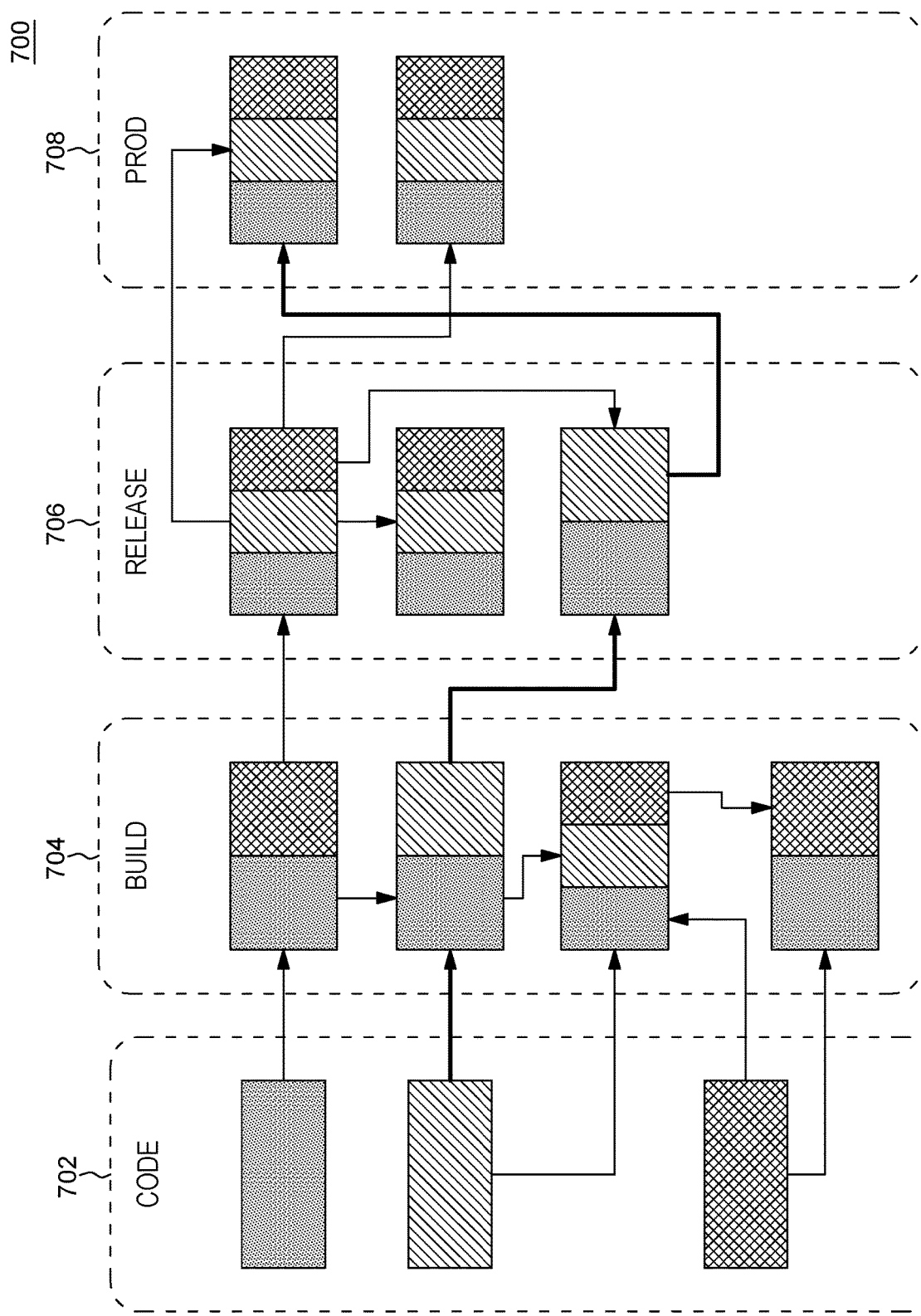
FIG. 7 is a block diagram of a third embodiment of a system according to the present invention.

Block diagram 700 of FIG. 7 is a graphical representation of the process converting a simple code dimension into a final product. That is, the code dimension is ultimately converted into an optimized enterprise product that is built by various portions of the code dimension while taking into account changes that are dynamically made to the various streams. Block diagram includes: code portion 702, build module 704, release module 706, and final product 708.

Figure 8:
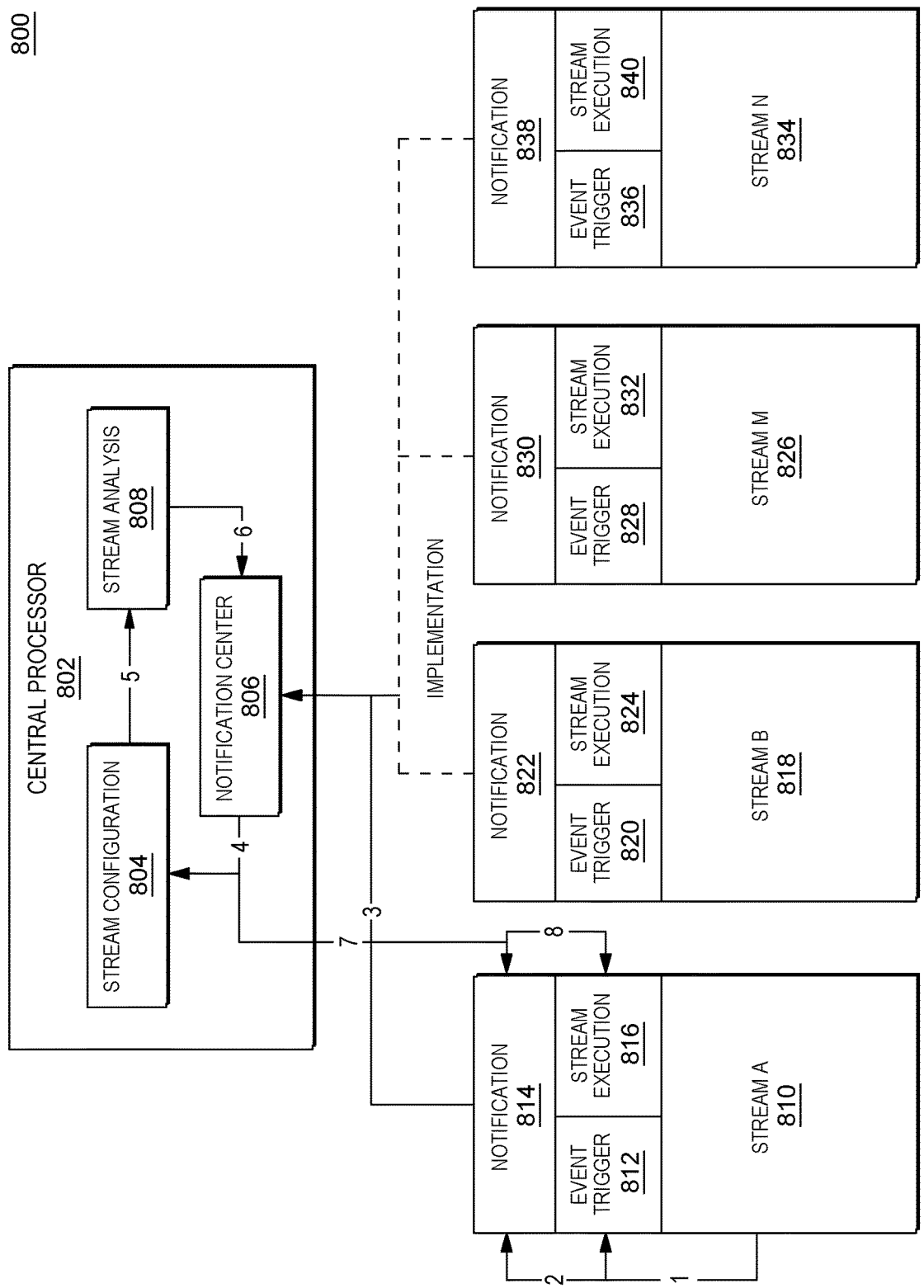
FIG. 8 is a block diagram of a fourth embodiment of a system according to the present invention.

Systems diagram 800 of FIG. 8 is a graphical representation of a system architecture for implementing certain embodiments of the present invention. The system architecture shown in FIG. 8 includes the following main components: central processor 802, stream A 810, stream B 818, stream M 826 and stream N 834. Central processor 802 further includes the following sub-components: stream configuration module 804, notification center 806 and stream analysis module 808.

Stream A 810 includes event trigger 812, notification module 814 and stream execution module 816. Stream B 818 includes event trigger 820, notification module 822 and stream execution module 824. Stream M 826 includes event trigger 828, notification module 830 and stream execution 832. Finally, Stream N 834 includes event trigger 836, notification module 838 and stream execution module 840.

Figure 9:
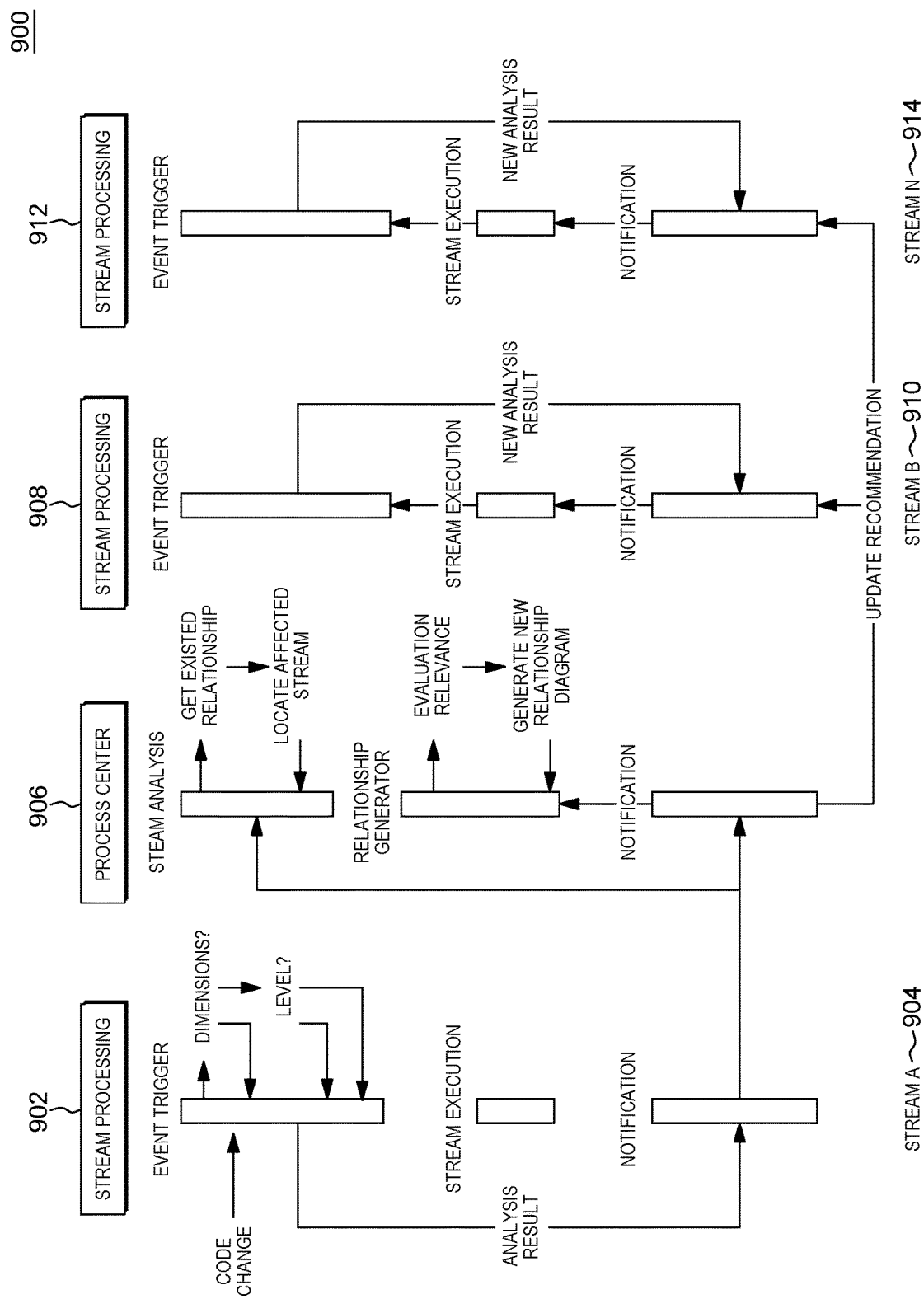
FIG. 9 is a flow diagram showing information that is helpful in understanding embodiments of the present invention.

Flow diagram 900 of FIG. 9 shows one instance of implementing a stream update process in a dynamic manner. Flow diagram 900 includes the following main components: stream processing module 902, stream A 904, process center 906, stream processing module 908, stream B 910, stream processing module 912 and finally stream N 914.

With respect to generating a notification of the result of the stream processing, stream processing module 902 considers whether there is a change to code dimension, what other dimensions are being used (such as an environment dimension or a data dimension, as shown in FIG. 5).

With respect to performing a stream analysis at process center 906, it must first be determined what the previously existing stream relationship is as well as an identification of a stream or set of streams that are affected. From this determination, the relevance between these streams must be determined, which results in the creation of a new stream relationship diagram (for instance, the multi-dimensional relationship shown in FIG. 5).

Stream processing module 908 receives an update recommendation for stream B 910. The substantive information contained in the stream update notification is then acknowledged, and stream B 910 is updated to reflect the change requested and/or suggested in the received update recommendation. This update to stream B 910 results in a new stream analysis result (that is, the multi-dimensional relationship graphic, as illustratively shown in FIG. 5, is updated to reflect the change made to stream B 910). This process is once again repeated by stream processing module 912 for stream N 914.

Figure 10A:
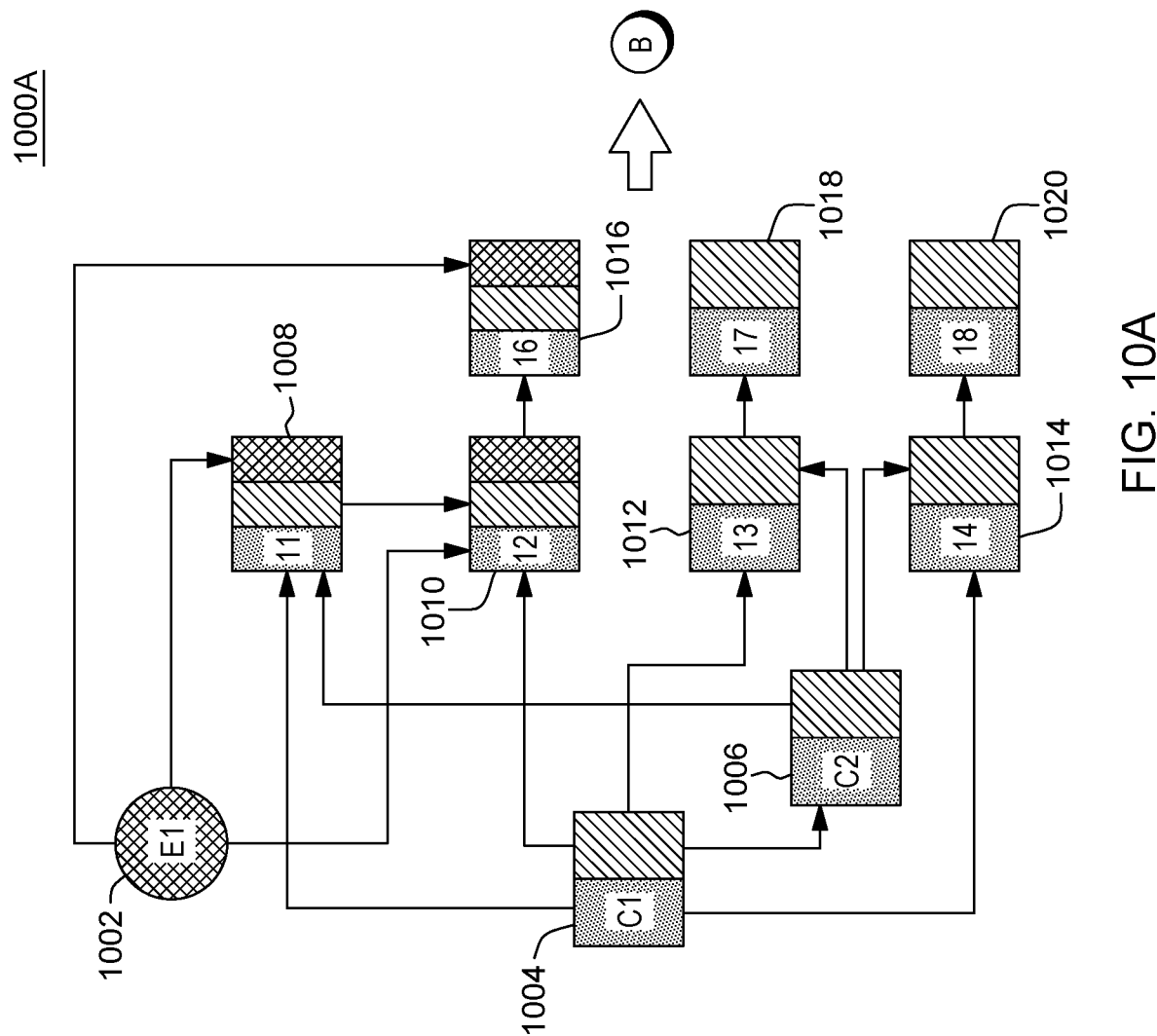
FIG. 10A is a block diagram showing information that is helpful in understanding embodiments of the present invention.
Figure 10B:
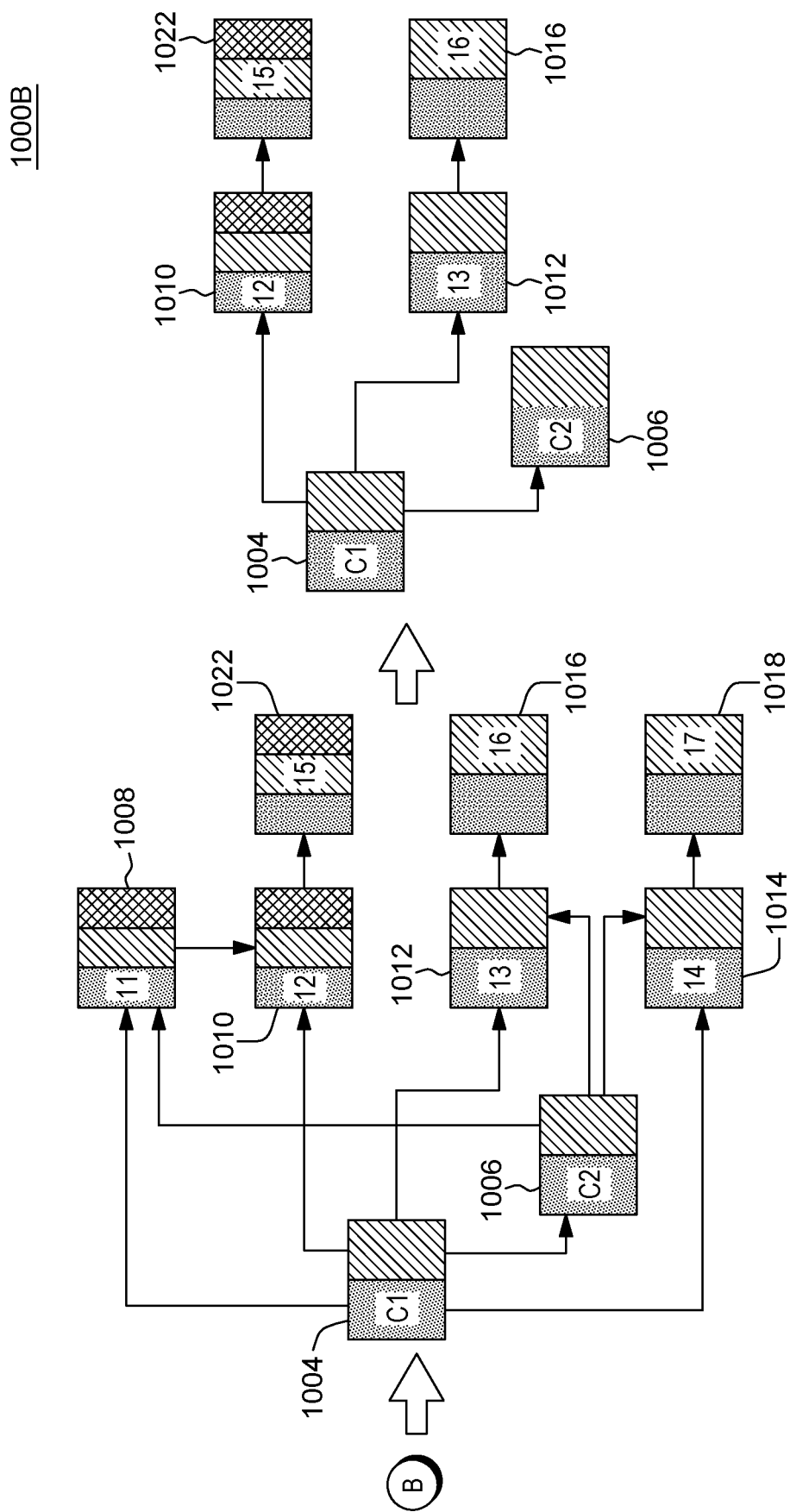
FIG. 10B is a block diagram showing information that is helpful in understanding embodiments of the present invention.

Block diagrams 1000A and 1000B of FIGS. 10A and 10B collectively show an example of obtaining an optimized tree with varying thresholds by pruning the existing multi-dimensional stream relationship based upon the dimension type (such as code, data and environment) and relevance. Block diagrams 1000A and 1000B includes the following components: E1 1002, C1 1004, C2 1006, I1 1008, I2 1010, I3 1012, I4 1014, I6 1016, I7 1018, I8 1020 and I5 1022.

FIG. 10B illustrates that C1 1004 has the greatest impact from one dimension, and that the component with the highest level of relevance to it is C2. After combining multiple dimensions, the impact of a second dimension on C1 increases when the first dimension changes. Meanwhile, the relevance degree of I5 and I6 also increases from the second dimension. Through observing these changes, the streams with the highest degree of relevance (as calculated in Formula 1, discussed above) are isolated easily and quickly when any further changes are made. In this manner, embodiments of the present invention can quickly find the most relevant stream through the graphical representation generated by FIG. 10 based upon the setting of the change threshold.

Advantages to implementing embodiments of the present invention by an enterprise and/or enterprise user with respect to a given set of streams includes: (i) quickly locate the most relevant stream according to different colors and color depth; (ii) keep monitoring multiple relationships between streams through the dynamic superposition of different dimensions, thereby maintaining the accuracy and speed of updates; (iii) the development team can understand more for the influence of different dimensions for modules, which improves the efficiency and quality of development work; and (iv) the quality inspection team can only test in related fields, thereby reducing the test workload and avoiding repetitive work.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Automatically: without any human intervention.

Dynamically: an action performed without any human intervention and/or on a periodic or intermittent basis depending on the existence and/or completion of certain specified or unspecified conditions.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Comprising/comprise/comprises: As used in the specification (specifically, outside of the claim section), this term is intended to be perfectly synonymous with the term "include" and its various conjugated forms (as defined herein in this specification). The term "comprise" (and its various conjugated forms) as used in the claims is to be given its ordinary interpretation that is consistent with long-standing and standard patent claim interpretation.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

What is claimed is:

1. A computer-implemented method (CIM) comprising:
    receiving, by a stream reception module, a plurality of streams, with the plurality of streams including information indicative of a given stream dimension;
    monitoring sequence and correlation of streams in the plurality of streams to generate a multi-dimensional stream relationship diagram;
    responsive to the generation of the multi-dimensional stream relationship diagram, dynamically adjusting relevance of the given stream dimensions that respectively correspond to each stream in the multi-dimensional stream relationship diagram;
    responsive to the dynamic adjustment, determining a given stream of the plurality of streams has achieved a sufficient change; and
    creating an optimized stream relationship diagram to reflect the change made to the given stream of the plurality of streams.

2. The CIM of claim 1 wherein at least a first stream of the plurality of streams receiving by the stream reception module has one dependency to a second stream.

3. The CIM of claim 1 wherein the relevance of the given stream dimensions that respectively correspond to each stream in the multi-dimensional stream relationship diagram is based, at least in part, upon a relevance evaluation model.

4. The CIM of claim 3 wherein the relevance evaluation model places relevance weight values on the given stream dimensions that correspond to each stream in the multi-dimensional stream relationship diagram.

5. The CIM of claim 3 wherein the relevance evaluation model sets a correlation for the plurality of streams.

6. The CIM of claim 1 wherein the optimized stream relationship diagram includes fewer dimensions than the multi-dimensional stream relationship diagram.

7. A computer program product (CPP) comprising:
    a machine readable storage device; and
    computer code stored on the machine readable storage device, with the computer code including instructions and data for causing a processor(s) set to perform operations including the following:
        receiving, by a stream reception module, a plurality of streams, with the plurality of streams including information indicative of a given stream dimension,
        monitoring sequence and correlation of streams in the plurality of streams to generate a multi-dimensional stream relationship diagram,
        responsive to the generation of the multi-dimensional stream relationship diagram, dynamically adjusting relevance of the given stream dimensions that respectively correspond to each stream in the multi-dimensional stream relationship diagram,
        responsive to the dynamic adjustment, determining a given stream of the plurality of streams has achieved a sufficient change, and
        creating an optimized stream relationship diagram to reflect the change made to the given stream of the plurality of streams.

8. The CPP of claim 7 wherein at least a first stream of the plurality of streams receiving by the stream reception module has one dependency to a second stream.

9. The CPP of claim 7 wherein the relevance of the given stream dimensions that respectively correspond to each stream in the multi-dimensional stream relationship diagram is based, at least in part, upon a relevance evaluation model.

10. The CPP of claim 9 wherein the relevance evaluation model places relevance weight values on the given stream dimensions that correspond to each stream in the multi-dimensional stream relationship diagram.

11. The CPP of claim 9 wherein the relevance evaluation model sets a correlation for the plurality of streams.

12. The CPP of claim 7 wherein the optimized stream relationship diagram includes fewer dimensions than the multi-dimensional stream relationship diagram.

13. A computer system (CS) comprising:
    a processor(s) set;
    a machine readable storage device; and
    computer code stored on the machine readable storage device, with the computer code including instructions and data for causing a processor(s) set to perform operations including the following:
        receiving, by a stream reception module, a plurality of streams, with the plurality of streams including information indicative of a given stream dimension,
        monitoring sequence and correlation of streams in the plurality of streams to generate a multi-dimensional stream relationship diagram,
        responsive to the generation of the multi-dimensional stream relationship diagram, dynamically adjusting relevance of the given stream dimensions that respectively correspond to each stream in the multi-dimensional stream relationship diagram,
        responsive to the dynamic adjustment, determining a given stream of the plurality of streams has achieved a sufficient change, and
        creating an optimized stream relationship diagram to reflect the change made to the given stream of the plurality of streams.

14. The CS of claim 13 wherein at least a first stream of the plurality of streams receiving by the stream reception module has one dependency to a second stream.

15. The CS of claim 13 wherein the relevance of the given stream dimensions that respectively correspond to each stream in the multi-dimensional stream relationship diagram is based, at least in part, upon a relevance evaluation model.

16. The CS of claim 15 wherein the relevance evaluation model places relevance weight values on the given stream dimensions that correspond to each stream in the multi-dimensional stream relationship diagram.

17. The CS of claim 15 wherein the relevance evaluation model sets a correlation for the plurality of streams.

18. The CS of claim 13 wherein the optimized stream relationship diagram includes fewer dimensions than the multi-dimensional stream relationship diagram.

* * * * *